Figure 1:
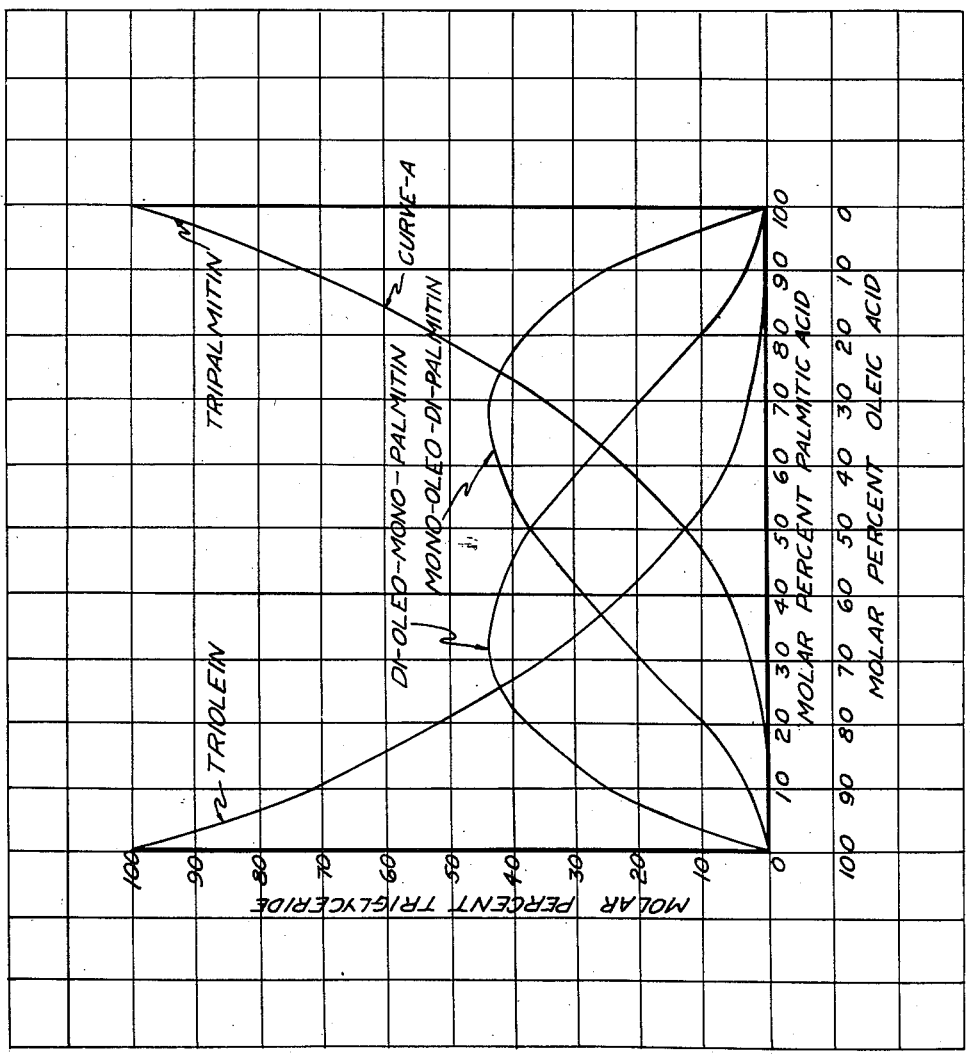

Patented June 1, 1948

2,442,531

UNITED STATES PATENT OFFICE 2,442,531

PROCESS FOR TREATING FATS AND FATTY OILS

Eddy W. Eckey, Wyoming, Ohio, assignor to The Procter & Gamble Company, Cincinnati, Ohio, a corporation of Ohio Application November 6, 1944, Serial No. 562,062

21 Claims. (Cl. 260—410.7)

This invention relates to a process for rearranging fatty acid radicals in triglyceride fats and fatty oils, which are referred to collectively hereinafter in the specification and claims as "fats," and more specifically to a process whereby rearrangement may be directed in a desired manner and controlled.

This application is a continuation-in-part of application Serial No. 418,590, filed November 10, 1941, which is now abandoned.

Fats are organic substances containing in each molecule a glycerin radical in chemical combination with three fatty acid radicals. Any natural fat as obtained from vegetable or animal sources comprises more than one kind of fatty acid radical, several kinds in the usual case, differing from each other in number of carbon atoms or in degree of unsaturation, or both, and consequently differing in their effect on the melting point and other properties of the fat.

Since the fatty acids are combined in groups of three in the individual fat molecules and since the fatty acids constituting the fat as a whole are a mixture of different species of fatty acid there is a wide range of glyceride compositions theoretically possible for fats having the same fatty acid composition.

If, for example, palmitic acid and oleic acid are taken as two fatty acids for consideration, the triglycerides that can exist and their respective melting points are as follows:

| | Melting Point, ° F. (of highest melting form) | Reference |
|---|---|---|
| Fatty Acids: | | |
| Palmitic acid | 145 | Phil. Mag. 48, 1085 (1924). |
| Oleic acid | 61 | Oil and Soap, 16, 207 (1939). |
| Glycerides: | | |
| Tripalmitin | 150 | JCS 1934, p. 669. |
| Monooleo dipalmitin (symmetrical). | 97 | Oil and Soap, 21, 42–46 (1944). |
| Monooleo dipalmitin (unsymmetrical). | 94 | JACS, 65, 2142–2144 (1943). |
| Dioleo monopalmitin (symmetrical). | | |
| Dioleo monopalmitin (unsymmetrical). | 64–66 | JACS, 65, 2142–2144 (1943). |
| Triolein | 40.5–41 | J. Biol. Chem. 132, 687 (1940). |

These data show that the kinds and proportions of the fatty acids combined in a pure triglyceride do not alone determine the physical properties, such as melting point, of the composition. To an even greater extent this is true of mixtures of such triglycerides where the variation in physical properties including sharpness of melting point, change in consistency with change in temperature, etc., may be very large among various compositions, all having the same fatty acid composition.

Let us consider, for example, the different triglyceride fats that can exist, all having palmitic acid and oleic acid combined in the proportion of one molecule of palmitic to two molecules of oleic.

If the pure acids are combined separately with glycerin, then mixed, the resulting fat consists of 33⅓ per cent tripalmitin and 66⅔ per cent triolein.

Another fat having the same fatty acid composition is pure dioleo monopalmitin.

The above two fats differ radically in properties. For example, the first has a complete melting point of about 139° F., or about 73° F. above the melting point of the second. Also since the first fat consists of a mixture of solid triglyceride with a large proportion of liquid triglyceride, it is semi-solid over a wide range of temperatures and softens only gradually as the temperature is raised in the range of ordinary room temperatures, whereas the second fat is quite solid and hard at a temperature a little below its melting point and changes abruptly from solid to liquid when its temperature is changed from 60° F. to 70° F.

Now if palmitic acid and oleic acid are first mixed in the stated proportions of one mol palmitic to two mols oleic and the mixture is reacted with glycerin to form triglycerides, all of the triglycerides listed in the above table will be formed and will exist in the resulting triglyceride mixture, and their respective proportions in the mixture can be calculated in accordance with the mathematical law of probabilities, assuming that there is no directing influence in the esterification process to cause specific combinations to form preferentially and that the reaction proceeds to equilibrium. According to such calculation, the mixture would contain 3.7 molar per cent tripalmitin, 22.2 molar per cent monooleo dipalmitin (symmetrical and unsymmetrical), 44.4 molar per cent dioleo monopalmitin (symmetrical and unsymmetrical) and 29.6 molar per cent triolein.

In Figure 1, I have shown in graphical form the mathematically calculated proportions in molar per cent of the four different types of triglycerides that are obtained in accordance with the mathematical law of probabilities by synthesizing triglycerides from mixtures of the two fatty acids in any proportion to each other.

These calculations also represent what occurs in actual fact when a triglyceride is synthesized from glycerin and a mixture of saturated and unsaturated fatty acids. Thus it is interesting to compare the calculated trisaturated glyceride curve (tripalmitin curve A of Figure 1) with the results of actual experiments as I have done in Figure 2 wherein I have reproduced curve A and have entered thereon, in the form of crosses, data representing the fully saturated triglyceride contents of synthetic fats prepared from mixtures of fatty acids containing various percentages of saturated fatty acid. These data are set forth and discussed more fully in a paper by Bhattacharya and Hilditch, published in the Proceedings of the Royal Society of London, volume 129, Series A, page 472 (1930). Within the accuracy of the experimental method, the data agree with the calculated curve A for per cent trisaturated glyceride, and it is a reasonable assumption that the same would be found to be true for the other triglycerides in the mixtures if experimental methods were available for determining their relative proportions.

The importance of the curves of Figure 1 in the present disclosure is that they may be taken also to represent the compositions that are obtained by molecular rearrangement of any triglyceride mixture having any fatty acid composition represented in the graph provided that the rearrangement is carried out to completion with the fat wholly in molten condition as in processes heretofore proposed. This may be done because the result of such molecular rearrangement is substantially the same as if the fatty acids were reacted with glycerin in a simple synthesis.

The type of glyceride structure normally present in natural fats should now be considered.

As formed in nature, the individual triglyceride molecules of the fats usually tend to be as heterogeneous as possible with respect to the fatty acid radicals contained in the structure, and consequently natural fats, with few exceptions, are composed preponderantly of mixed triglycerides which contain a variety of fatty acid radicals attached to the same glycerin radical as distinguished from the simple triglycerides containing the radicals of only one kind of fatty acid. (See "Chemical Constitution of Natural Fats" by Hilditch, published 1941 by John Wiley & Sons, pages 14–21). Thus a natural fat, such as cottonseed oil for example, will contain its principal acids—palmitic, linolic, and oleic—combined predominantly as mixed triglycerides, and although there exists in the mixture about 27 molar per cent of combined saturated fatty acids (practically all palmitic acid) less than one molar per cent of fully saturated triglyceride exists in the oil (ibid. page 190).

When a natural fat or mixture of natural fats is heated to high temperature substantially above the melting point in the presence of a suitable catalyst, an interchange or rearrangement of fatty acid radicals occurs. Since this interchange of radicals is reversible, the constitution of the fat molecules after continuance of such a reaction at high temperature for some time is, as already noted, in accordance with the operation of the law of probabilities, and the final result can be predicted from a knowledge of the nature of the fatty acids constituting the fat or mixture of fats.

Figure 2:
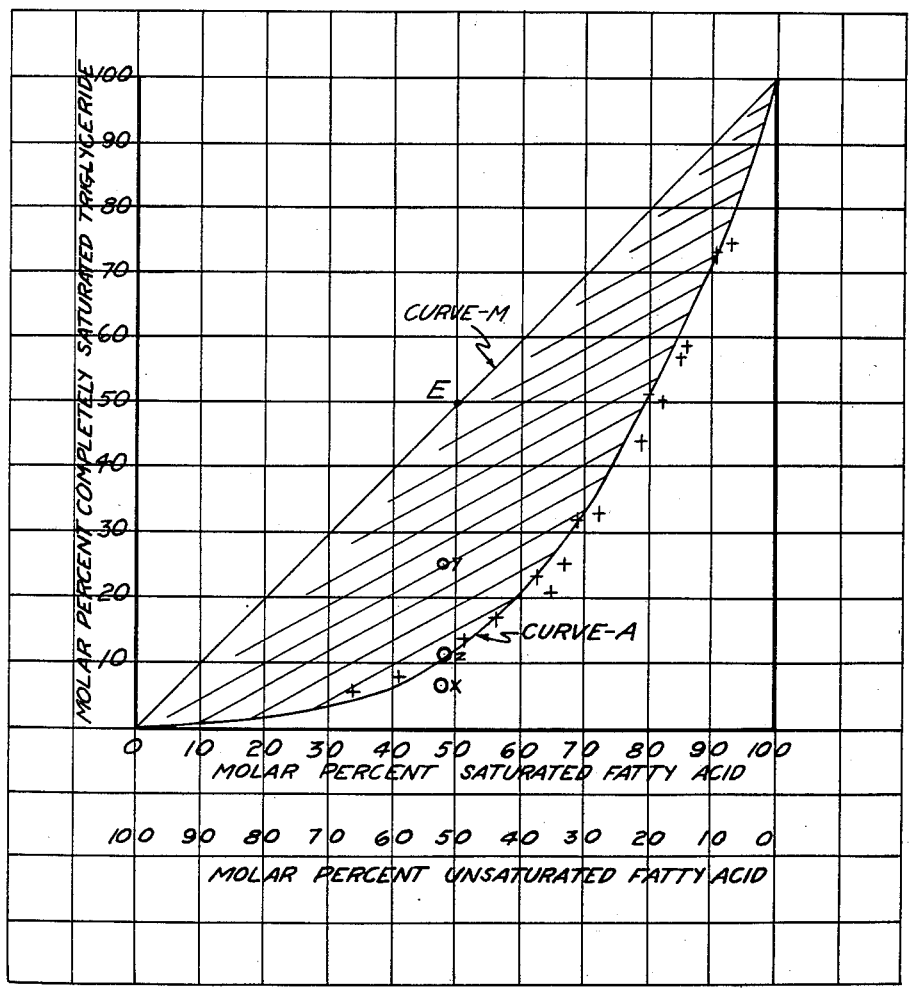

If, therefore, the saturated fatty acid content of any fat is known, the per cent trisaturated glyceride that is contained in the product of a molecular rearrangement conducted according to known liquid phase processes may be determined by calculation or by reference to curve A given in Figures 1 and 2, which may be taken in a general sense to represent the proportion of trisaturated glyceride as influenced by the proportion of combined saturated fatty acids in the mixed fatty acids constituting the fat. If, for example, a fat is selected which contains 50 molar per cent of combined saturated fatty acid and 50 molar per cent of combined unsaturated fatty acid, and if this fat is subjected to molecular rearrangement wholly in the liquid phase, the amount of trisaturated glyceride in the resulting product will be about 12½ molar per cent irrespective of the per cent of the trisaturated glyceride existing in the original fat. The remaining saturated fatty acid radicals will exist in a variety of mixed triglycerides.

In selected cases, there is utility in this type of rearrangement, but obviously there are limitations in the change that can be effected in the original fat, depending on how much the constitution of the natural fat differs from the constitution dictated by the law of probabilities.

The present invention utilizes the knowledge that fatty acid radicals in triglyceride fats will rearrange under the proper conditions of treatment, but seeks to direct and control that rearrangement so that a result not heretofore obtained is realized. I have discovered that the molecular rearrangement reaction can be made to proceed at a practical rate at much lower temperatures than heretofore proposed, and that if the fat is admixed with a suitable catalyst and rearrangement is permitted to take place at a temperature below that at which the liquid phase is saturated with respect to relatively high melting triglyceride fats, such high melting triglycerides formed in the course of the interchange of fatty acid radicals will crystallize from the liquid fat and take no further part in the interchange process. Thus, as molecules having low solubility in the liquid fat phase are formed and crystallize out of solution, further rearrangement of such molecules (such as would occur in the conventional single phase reaction) is prevented; consequently the percentage of higher melting molecules present in the whole fat mixture tends to increase as long as crystallization continues. Crystallization of such relatively insoluble solid triglycerides can continue as long as the solubility thereof in the liquid fat phase at the temperature of reaction is exceeded by the amount newly formed in the reaction. Also, since this solubility decreases with decrease in temperature, the maximum amount of solid fat that can crystallize will be greater at the lower temperatures.

Completely saturated triglycerides, such as tristearin and tripalmitin, are least soluble in the liquid constituents, and therefore normal practice of the present invention on the average fat will result to a large extent in the crystallization of completely saturated triglycerides and, accordingly, in the conversion of a large proportion of mixed saturated-unsaturated triglycerides into completely saturated triglycerides and completely unsaturated triglycerides.

In accordance with the present invention, therefore, it is possible by selection of a suitable low temperature for the reaction to control the extent of formation and separation of solid triglycerides having limited solubility at the selected temperature and thus to direct the result away from the result that is obtained when the reaction is allowed to proceed to completion wholly in the liquid phase in accordance with prior art processes. Another factor controlling the extent of the rearrangement is the period of time during which the reaction is allowed to proceed.

Within limits, therefore, the more the temperature is lowered below the highest temperature at which crystallization can occur and the longer the reaction is permitted to proceed toward completion, the greater will be the directive influence of the simultaneous crystallization upon the result of the rearrangement. Thus by the selection of appropriate conditions it is possible to carry the rearrangement of fats containing mixed saturated-unsaturated triglycerides substantially to the theoretical limit of completion, at which all of the saturated fatty acid radicals in the fat have been assembled into fully saturated triglycerides, and correspondingly all of the unsaturated fatty acids have been assembled into fully unsaturated triglycerides. The limit of fully saturated triglyceride is represented by curve M in Fig. 2. A fat, for example, that contains in combined form as mixed saturated-unsaturated triglycerides 50 molar per cent saturated fatty acid and 50 molar per cent unsaturated fatty acid would approach the composition containing an amount of fully saturated triglyceride represented by point E on curve M as the rearrangement into fully saturated and fully unsaturated triglycerides approached completion in accordance with my invention.

On the other hand, the corresponding limit of fully saturated triglyceride content for products obtained by applying known processes of glyceride rearrangement (i. e. rearrangement in the absence of a solid fat phase) is represented by curve A, and such rearrangement of the triglyceride fat just mentioned would produce no further change after the composition represented by the point on curve A directly under point E was reached, i. e. 12½ molar per cent fully saturated triglyceride with corresponding proportions of other triglycerides as represented in Figure 1.

Thus triglyceride compositions having completely saturated triglyceride contents falling within the range represented by the crosshatched area between curves A and M in Figure 2 are for the first time made available to the art by a molecular rearrangement process.

In the examples which follow various conditions of rearrangement as applied to various fats in accordance with my invention will be set forth, and in some instances it has been deemed advisable to show, for the sake of comparison, results obtained on the same oil when the molecular rearrangement is conducted in the liquid phase in accordance with known methods.

In the following examples the examination of the products to determine the extent of molecular rearrangement includes in many instances a determination of the content of substantially completely saturated triglyceride. In this determination the product of the rearrangement is first treated with an acidic substance as indicated to inactivate the catalyst, then melted, washed to remove any alcohol and inorganic salts present, and dried. A weighed portion of the thus treated product is dissolved in 10 volumes of petroleum ether and the solution is held for at least 18 hours at 40 to 50° F. to permit the crystallization of insoluble glycerides. The precipitated solids are filtered out, washed with cold petroleum ether, dried, and after the yield is determined analysis for iodine value is conducted to show the degree of unsaturation of the precipitated material. The fat remaining in solution in petroleum ether may also be recovered and analyzed for iodine value if this is deemed desirable.

*Example 1.—Palm oil—Rearrangement at 100° F.*

To a suitable vessel equipped with a mechanical agitator and provided with a thermometer, a reflux condenser, and means for blanketing the contents of the vessel with an inert gas such as nitrogen, is added refined, filtered and dried palm oil in molten condition. The oil is brought to 100° F. and while the oil is being stirred vigorously with the mechanical agitator there is added in the proportion of 0.6 part by weight for every 100 parts by weight of oil a catalyst solution consisting of about 26% sodium methoxide and 74% methanol which becomes finely dispersed throughout the oil. The agitation of the mixture at 100° F. is continued for about 6 hours. During this period of agitation glycerides insoluble in the reaction mass and consisting predominantly of completely saturated glycerides precipitate, and at the end of the agitation period the reaction mixture is in the form of a mushy mass. After this stage is reached, mechanical agitation may be discontinued and the mixture permitted to stand for about 18 hours at 100° F. At the end of this time the mass will be so solid that it will not pour. The reaction product is acidulated with dilute phosphoric acid to decompose the catalyst, then melted, washed with water and dried.

In an examination of the product and a comparison thereof with the original oil and with the product of rearrangement in the absence of a solid fat phase, the data of the following table were obtained. The greater increase in melting point and in the formation of substantially completely saturated triglycerides effected by the instant process of rearrangement is evident. The substantially completely saturated triglyceride results shown in the table have also been plotted in Figure 2 as points X, Y, and Z on the ordinate representing a triglyceride having 48% combined saturated fatty acid to show that the assertions previously made regarding the formation of completely saturated triglycerides are confirmed in practice.

|  | Original Palm Oil | Product of this Example 1 | Product of single phase rearrangement. Three days at 120° F. with about 0.6% of a 20% solution of sodium methoxide in methyl alcohol |
|---|---|---|---|
| Iodine Value | 52.7 | | |
| Capillary M. P., °F | 103.7 | 130 | 116.6 |
| Per cent combined saturated fatty acid | 48 | | |
| Stearine obtained by crystallization from petroleum ether: | | | |
| Yield, Wt. per cent of sample | 6.3(X) | 25.7(Y) | 11.2(Z) |
| Iodine Value | 7.2 | 1.7 | 3.4 |
| Capillary M. P., °F | 142 | 142 | 135 |

*Example 2.—Palm oil—Rearrangement at 80° F.*

Crude palm oil having an iodine value of 50.8 and acid value of 13.1 was bleached with activated earth and refined with alkali then rebleached with fuller's earth and dried by blowing with steam at reduced pressure for 2 hours at 210–220° C.

A portion, 500 parts, of the prepared palm oil was placed in a vessel equipped with a motor-driven agitator and with suitable inlets and outlets to provide passage of a stream of purified nitrogen through the vessel to exclude oxygen. The dry oxygen-free oil in the vessel was chilled to 55° F. with the aid of a bath of cold water. The oil was held at 50 to 55° F. for 1 hour, then warmed to 100° F. and stirred at this temperature for ½ hour. Following this treatment, the oil contained a large number of crystals of solid fat and was an opaque fluid.

To the palm oil in this condition, was added a catalyst suspension consisting of sodium methoxide in xylene, previously prepared by gradual addition of anhydrous methanol to an emulsion of molten sodium in hot xylene. The suspension contained 0.1 g. sodium methoxide per milliliter and was added in quantity to give 0.15 part sodium methoxide per 100 parts of palm oil. The mixture was agitated for 3 hours at 100° F., at the end of which time the proportion of solid in the mixture had increased substantially, then stored for 16 hours without agitation in a cabinet held at 80° F.

The rearrangement was then terminated by removing the fat from the reaction vessel at 80° F. and macerating it with a quantity of glacial acetic acid slightly in excess of the quantity equivalent to the catalyst used. The fat was then melted, filtered, and heated under reduced pressure at 140° C. to remove xylene. The characteristics of the rearranged product are listed in the second column of the following table.

In order to compare the results of this rearrangement with the result obtained by rearrangement of the oil wholly in the liquid phase, a portion (500 parts) of the same prepared palm oil was treated in the same apparatus and the same catalyst as described above except that the fat was held at 120° F., at which temperature it remained molten, throughout the time (30 minutes) that the catalyst was allowed to remain active. Experience has shown that 30 minutes is sufficient time for the reaction to reach equilibrium when the rearrangement is conducted at this temperature and catalyst concentration. After inactivation of the catalyst with acetic acid and filtration and removal of xylene, the fat had the characteristics listed in the third column of the following table.

In order further to compare the results of rearrangement with simultaneous crystallization with those obtained by rearrangement wholly in the liquid phase, a portion of the same palm oil was rearranged substantially in accordance with the procedure described in U. S. Patent 1,873,513. The palm oil (502 parts) in a vessel equipped with a motor-driven agitator was mixed at 44° C. (111° F.) with 0.9% of sodium ethylate in the form of a suspension in xylene containing 0.045 g. $NaOC_2H_5$ per milliliter. The mixture was heated under reduced pressure (about 0.5 inch of mercury pressure) to a temperature of 200° C. (392° F.) and held at this temperature for 2 hours. The resulting fat had the characteristics shown in the fourth column of the table.

The following data will show clearly that the change in the proportion of fully saturated triglycerides present in the fats as effected by the last two procedures, in which the reaction was conducted wholly in molten condition, was considerably less than the corresponding change effected when the process of the present invention was employed.

|  | Refined, bleached Palm Oil, before rearrangement | Palm Oil rearranged with simultaneous crystallization, with final rearrangement temp. of 80° F. | Palm Oil rearranged in single phase at 120° F. without simultaneous crystallization | Palm Oil rearranged by procedure of Van Loon, U. S. 1,873,513 at 200° C. (392° F.) |
|---|---|---|---|---|
| Catalyst: |  |  |  |  |
| Kind |  | $NaOCH_3$ | $NaOCH_3$ | $NaOC_2H_5$ |
| Wt. per cent of oil |  | 0.15 | 0.15 | 0.9 |
| Iodine Value | 50.9 | 51.0 | 50.9 | 50.7 |
| M. P. (Capillary), ° F | 113.4 | 133.2 | 121.2 | 119.3 |
| Cloud Point, ° F | 81.9 | 100.4 | 83.5 | 83.3 |
| Congeal Point, ° F | 86.4 | 124.2 | 92.8 | 90.1 |
| Stearine obtained by crystallization from 10 volumes of petroleum ether at 50° F.: |  |  |  |  |
| Quantity, Wt. per cent of oil | 8.7 | 36.1 | 13.1 | 10.7 |
| Iodine Value | 9.3 | 1.3 | 4.4 | 4.0 |
| M. P. (Capillary), ° F | 141.8 | 143.1 | 139.4 | 139.6 |
| Quantity, corrected to zero Iodine Value [1] | 7.2 | 35.5 | 12.1 | 9.9 |
| Increase in fully saturated glycerides produced by rearrangement, Wt. per cent of whole fat |  | 28.3 | 4.9 | 2.7 |

[1] Assuming that iodine value of stearine is due to oleine retained by the crystals of stearine.

*Example 3.—Cocoa butter—Rearrangement at 80° F.*

Cocoa butter having an iodine value of 38.7 and acid value of 2.1 was refined with alkali, filtered and deodorized by blowing with steam at reduced pressure at 210° C.

The cocoa butter prepared in this way was mixed with 0.45% by weight of sodium tertiary butoxide in the form of a suspension in xylene under conditions that prevented contact of the mixture with moisture or air. The mix was stirred for 45 minutes at 120–130° F., then held without stirring for 24 hours at 100° F., 24 hours at 90° F., and finally 24 hours at 80° F. The rearrangement was stopped by macerating the fat with glacial acetic acid in quantity equal to 1¼ equivalents of acid per equivalent of catalyst used. The fat was then melted and washed with aqueous phosphoric acid solution (5% concentration) and with water. The washed fat was refined with alkali, washed with aqueous alcohol solution and deodorized with steam at low pressure.

The fat had the following characteristics. For comparison, the results obtained by the application of the Van Loon procedure on cocoa butter as shown in U. S. P. 1,873,513 are also given. Again the marked change effected by the process of this invention is shown.

| | Iodine Value | Melting Point (Capillary), °F. | Stearine obtained by crystallization from 10 volumes petroleum ether at 50° F. | |
|---|---|---|---|---|
| | | | Yield, Per Cent | I. V. |
| Refined Cocoa Butter | 38.6 | 91.0 | Trace | |
| Same after rearrangement with simultaneous crystallization | 38.6 | 135.9 | 46.6 | 2.9 |
| Data on Van Loon cocoa butter rearrangement taken from U. S. P. 1,873,513 | | [1] 103.5 | | |

[1] (39.7° C.).

Example 4.—Coconut oil—Rearrangement at 60° F.

In a reaction vessel adapted for mechanical agitation of its contents and for exclusion of air by a stream of purified nitrogen, a charge of 1000 parts of refined, bleached, dried coconut oil was cooled to 78° F. To the oil at this temperature was added 2.5 parts of sodium methoxide dissolved in methanol (0.25 g. NaOCH₃ per ml. of solution). The well-stirred oil-catalyst mixture was then seeded with fat crystals by the addition of 200 parts of partially crystallized coconut oil, prepared by chilling melted coconut oil rapidly to 73° F. then stirring it without further cooling until it began to thicken rapidly, at which stage it was introduced into the reaction vessel. The mixture was then transferred to another container which was sealed and placed in a constant temperature room held at 78° F. After standing overnight the fat was at a temperature of 80° F. and had solidified to the extent that it would not flow. The temperature was gradually lowered to 60° F. over a period of 7 days, and at the end of 9 days, with the fat at a final temperature of 60° F., the rearrangement was terminated by inactivation of the catalyst. This was done by mixing the solid fat in small pieces with aqueous phosphoric acid solution (2% concentration) at 60° F. The mixture was warmed slowly with vigorous agitation until the fat was melted, after which the fat was washed with water and deodorized by blowing with steam at reduced pressure at 225° C. Comparative data and characteristics are presented in the following table.

The fat so prepared was a hard solid at ordinary room temperature, suitable for use as a confectioner's butter. In contrast, the original oil was completely liquid at 80° F. and the same oil rearranged wholly in the liquid phase was much softer at 80° F. than the oil rearranged as described above. Relative hardness was determined by means of a standardized penetration test in which increasing penetration value denotes increasing softness.

| | Iodine Value | Melting Point (Capillary), °F. | Hardness at 80° F., in terms of penetration |
|---|---|---|---|
| Coconut Oil | 9.2 | 78.8 | liquid |
| Coconut Oil rearranged with simultaneous crystallization | 9.2 | 91.6 | 6.8 |
| Coconut oil rearranged in single phase | 9.2 | 82.8 | 19.3 |

Example 5.—Cottonseed oil—Rearrangement at 80° F.

1000 parts refined, filtered, dried cottonseed oil, free from peroxides, were mixed for 15 minutes at room temperature (82° F.) with 2 parts sodium methoxide in the form of a suspension in xylene. The mixture was transferred to a number of smaller containers which were tightly sealed after replacing the air in the outage with dried nitrogen. These containers were then placed in an apparatus, in which they could be rotated constantly about their long axes at a speed of 9 R. P. M. The apparatus was then operated in a constant-temperature room held at 80° F. Crystallization gradually took place in the various containers so that the various charges gradually became a slurry of fat crystals in oil.

During the overall rotation period individual containers were removed from the machine from time to time and each charge was immediately treated with dilute aqueous hydrochloric acid at 80° F. to inactivate the catalyst. The characteristics of the fats obtained after this acidulation and after treatment to remove the xylene introduced with the catalyst are given in the table.

One charge, after 67 hours at 80° F., was held at 120° F. overnight before inactivation of the catalyst with acid. This treatment caused the fat to melt and allowed its composition to revert to that composition obtained by rearrangement wholly in the liquid phase.

| | Iodine Value | Cloud Point, °F. | Stearine obtained by crystallizing the fat from 10 volumes of petroleum ether at 40° F., Yield, Per Cent |
|---|---|---|---|
| Cottonseed Oil before rearrangement | 109.3 | 27.5 | None |
| Cottonseed Oil rearranged 22 hrs. at 80° F | | | 9.25 |
| Cottonseed Oil rearranged 46 hrs. at 80° F | | | 10.1 |
| Cottonseed Oil rearranged 67 hrs. at 80° F | | | 10.7 |
| Cottonseed Oil rearranged 91 hrs. at 80° F | | 83.1 | 10.9 |
| Cottonseed Oil rearranged 136 hrs. at 80° F | | 84.7 | 11.6 |
| Cottonseed Oil rearranged 67 hrs. at 80, followed by 16 hrs. at 120° F | | 57.8 | 0.8 |

Example 6.—Cottonseed oil—Rearrangement at 70° F.

100 parts of refined and filtered cottonseed oil having an iodine value of 109.3 according to the Wijs method of determination and a cloud point of 27.5° F. were dried. The oil was cooled to 120° F. in a flask arranged to exclude air and then mixed for 30 minutes mechanically with 0.2 parts of sodium methoxide in the form of a 10% suspension in xylene. This catalyst was prepared by the gradual addition of dry methanol to an equivalent quantity of finely divided metallic sodium suspended in xylene during vigorous agitation.

The mixture of oil and catalyst was chilled at 50° F. until crystals of solid fat began to separate from the oil, and then set aside at 70° F. for 3 days. At the expiration of the 3-day period, the mixture had become solid.

The characteristics of the fat after acidulation with hydrochloric acid and treatment to remove xylene introduced with the catalyst are given in the table below. The data clearly show the marked increase in cloud point and saturated triglyceride content effected by the treatment with no significant change in the ratio of saturated to unsaturated constituents as indicated by iodine value.

|  | Iodine Value | Cloud Point, °F. | Stearine obtained by crystallizing the fat from 10 volumes of petroleum ether at 40° F. | |
|---|---|---|---|---|
|  |  |  | Yield, Per Cent | Iodine Value |
| Cottonseed oil before rearrangement | 109.3 | 27.5 | None | |
| Rearranged cottonseed oil | 109.5 | 88.2 | 13 | 4.5 |

*Example 7.—Cottonseed oil—Rearrangement at 50° F.*

1000 parts refined, dry, peroxide-free cottonseed oil in molten condition were mixed for 30 minutes with 2 parts of sodium methoxide in the form of a suspension in xylene. Portions of the mix were transferred to individual containers which were then closed and sealed under vacuum. The sealed containers were placed in a room maintained at 50° F. and allowed to remain for various lengths of time. The charge in each container was mixed with dilute aqueous hydrochloric acid to inactivate the catalyst immediately on removal from the 50° F. room.

The fats, after washing and removal of xylene, had the characteristics given below. Comparative data on the original fat and on the same fat rearranged wholly in the liquid phase, for 30 minutes at 120° F. are also given. The characteristically higher cloud point and saturated triglyceride content of the product of the present invention are readily seen.

In addition, the charge in one of the containers held 4 months at 50° F. was held for 3 days at 120° F. The result showed that the catalyst was still active at the end of four months, and that melting the rearranged fat and holding it melted in the presence of catalyst caused the fat to change back to the condition produced by rearrangement in the liquid phase.

|  | Iodine Value | Cloud Point, °F. | Stearine obtained by crystallizing the fat from 10 vols. of petroleum ether at 40° F. | |
|---|---|---|---|---|
|  |  |  | Yield, Per Cent | I. V. |
| Cottonseed Oil before rearrangement | 106.3 | 25.7 | None | |
| Cottonseed Oil rearranged, 30 min. at 120° F | | 57.5 | | |
| Cottonseed Oil, rearranged, 18 hrs. at 50° F | | 69.4 | | |
| Cottonseed Oil rearranged, 6 days at 50° F | | 86.9 | | |
| Cottonseed Oil rearranged, 79 days at 50° F | | 89.4 | 14.8 | 2.4 |
| Cottonseed Oil rearranged, 4 months at 50° F | | 88.7 | 15.2 | |
| Cottonseed Oil rearranged, 4 months at 50° F., then 3 days at 120° F | | 58.8 | | |

*Example 8.—Cottonseed oil—Rearrangement at 32° F.*

500 parts refined, bleached cottonseed oil having an iodine value of 105.2 and cloud point of 28° F. were heated to 200° C. under reduced pressure to remove moisture and destroy peroxides. The oil was cooled to 120° F. and mixed with a suspension of sodium methoxide in xylene in proportion to give 0.3 part sodium methoxide per 100 parts by weight of oil. The mixture was then transferred to a cylindrical reaction vessel which was tightly closed, then placed on its side in a rotating machine adapted to rotate the vessel constantly at 6 R. P. M. about its long axis. The vessel was allowed to rotate for 20 hrs. in a room held at 70° F., then 24 hrs. at 60° F., then 48 hrs. at 50° F. and then 7 days at 40° F. During this reaction period the fat gradually became solid. The vessel and its charge were then taken from the rotating machine and placed in a room held at 32° F. After 10 days at this temperature, the fat was treated with glacial acetic acid, then melted and washed with dilute mineral acid and water. After heating under reduced pressure to remove traces of moisture and xylene, the fat was examined by determining the quantity of solid triglycerides that it would precipitate when crystallized from four volumes of acetone-alcohol mixture (93 parts acetone, 7 parts alcohol) at 70° F. By this crystallization, 19.1% of solid triglycerides having an iodine value of 5.0 and a melting point of 140.2° F. were obtained, whereas the original cottonseed oil gave no precipitate under the same conditions of crystallization. A very large proportion of the saturated acids present in the original fat was thus rearranged and concentrated in the fully saturated triglyceride portion of the glyceride mixture constituting the fat.

*Example 9.—Cottonseed oil—Rearrangement in solvent*

1000 parts refined, bleached and deodorized cottonseed oil were dissolved in an equal volume of commercial octane (Skellysolve E). To this mixture at 100° F. were added .4 part of sodium methoxide in the form of a suspension in xylene per 100 parts of the solution. Portions of the mix were put into reaction vessels which were tightly stoppered and then stored in constant-temperature compartments, one each at 100°, 70°, 50° and 32° F. The contents of the vessels were agitated occasionally during storage. In the case of the mixtures stored at 100° F. and at 70° F. no crystallization took place. At 50° F. and lower temperatures, crystallization gradually occurred until a large proportion of stearine was visible.

At the end of the periods indicated in the following table, the mixtures were acidulated to inactivate the catalyst and terminate the rearrangement. After washing and removal of solvent, the fat samples obtained had the characteristics given below.

| Time and Temperature of rearrangement | Cloud Point of Rearranged Product, °F. |
|---|---|
| Not rearranged | 25.5 |
| 3 days at 100° F. (no crystallization) | 56.0 |
| 4 days at 70° F. (no crystallization) | 57.5 |
| 14 days at 50° F. (crystallization occurred during rearrangement) | 83.3 |
| 7 days at 50° F. followed by 14 days at 32° F | 87.8 |

By comparison of these data with those of Examples 5 and 7, it can be seen that substantially the same results are produced by rearrangement without simultaneous crystallization whether or not solvent is present, although the temperatures of rearrangement may differ. Also, when rearrangement takes place simultaneously with crystallization, a different triglyceride composition is obtained as is the case when no solvent is present. The temperatures required to produce crystallization are affected by the presence of solvent, so that the results obtained at 50° F. with the oil dissolved in octane are about the same as those produced by rearrangement at 80° F. without solvent present.

Example 10.—Hydrogenated cottonseed oil, iodine value=78—Rearragnement at 70° F.

Refined cottonseed oil hydrogenated to an iodine value of 78 was dried. The oil was then cooled to substantially room temperature under a blanket of inert gas, with the exclusion of air, and was mixed thoroughly with the aid of a mechanical stirrer with 0.2% sodium methoxide catalyst in the form of a finely divided suspension in xylene. The oil-catalyst mixture was sealed in an air-tight container which was then rotated slowly to provide continuous gentle agitation of the oil. Agitation was conducted for 18 hours in a room at 90° F., then for 24 hours in a room at 80° F., and then for 48 hours in a room at 70° F. At the end of the treatment the mixture was a thick suspension of solid crystals in liquid oil. The catalyst was then inactivated and thereafter refined with alkali and deodorized.

|  | Before Rearrangement | After Rearrangement |
|---|---|---|
| Cloud point, ° F | 70.7 | 97.9 |
| Melting point, ° F | 94.6 | 112.8 |
| Titer of fatty acids, ° C | 33.1 | 33.1 |
| Solid triglycerides obtained by crystallization from 10 volumes of petroleum ether at 40° F.: | | |
| Yield, Wt. Per Cent | 0.14 | 14.3 |
| Iodine Value | 25.2 | 19.8 |

Example 11.—Menhaden oil—Rearrangement at 50° F.

600 parts of refined, bleached and deodorized menhaden oil were introduced into a container equipped with a motor driven agitator. To the charge was added 0.3% of sodium methoxide in the form of a suspension in xylene prepared by the gradual addition during vigorous agitation of anhydrous methanol to an equivalent quantity of finely divided sodium in xylene. The mixture of oil and sodium methoxide catalyst was agitated for 30 minutes at 120° F.

This oil-catalyst mixture was then placed in a room at 40° F. for 2 hours; then stored for 2 days in a room at 70° F., then 3 days at 60° F., and then 5 days at 50° F.

Thereafter the rearranged oil at about 50° F. was treated with dilute phosphoric acid to inactivate the catalyst. The product was subsequently melted, washed, and dried.

The following data clearly show the marked increase in cloud point and in substantially completely saturated triglyceride content effected by the rearrangement with simultaneous crystallization.

|  | Before Rearrangement | After Rearrangement |
|---|---|---|
| Cloud point, ° F | 38.1 | 83.5 |
| Solid triglycerides crystallized from a solution in 10 volumes of petroleum ether at 32° F.: | | |
| Yield, Wt. Per Cent | <1 | 16.9 |
| Iodine value | | 4.5 |

Example 12.—Kokum butter—Rearrangement at 140–110° F.

Kokum butter having an iodine value of 36.3 and a melting point of 109° F., was refined with alkali, filtered, and dried. 1000 parts of the fat were heated to 180° F. in a reaction vessel from which the air was excluded. The fat was then allowed to cool to 160° F. at which temperature sodium methoxide in xylene suspension was added in the proportion of 0.25 part sodium methoxide per 100 parts of fat.

The mixture was stirred with a motor-driven agitator for 30 minutes at 150–160° F., at the end of which time a sample was withdrawn and acidulated, then examined to determine the characteristics of the product rearranged wholly in the liquid phase.

The remainder of the mixture was allowed to cool gradually to 140° F., at which temperature crystallization began to occur. The mix was allowed to cool further to 125° F. with continued stirring. Crystallization then became rapid enough to raise the temperature of the mixture to 135° F. At about this point the mixture contained so much solid that mechanical agitation was not feasible. The mix was then allowed to cool slowly to 110° F. At this point, about 6½ hours after the addition of catalyst, glacial acetic acid was added to the flask to inactivate the catalyst and terminate the rearrangement. Later the mixture was removed from the vessel, ground to ensure thorough inactivation of the catalyst by the acid, then melted, refined, washed, and deodorized.

The characteristics of the product in comparison with those of the fat rearranged in the absence of simultaneous crystallization are given in the following table. The characteristic higher melting point and content of saturated triglycerides effected by operation of the present invention is shown.

|  | Kokum Butter, rearranged wholly in liquid phase | Kokum Butter, rearranged with simultaneous crystallization |
|---|---|---|
| Melting Point (capillary), ° F | 146 | 156 |
| Crystallization from 10 volumes of petroleum ether at 50° F.: | | |
| Stearine Yield, Per Cent | 36.8 | 55.6 |
| Recrystallization of stearine from petroleum ether at 50° F.: | | |
| Stearine Yield, per cent of whole fat | 27.6 | 53.4 |
| Melting Point of Stearine, ° F | 159 | 161 |
| Iodine Value of Stearine | 7.0 | 1.2 |
| Melting Point of Oleine, ° F | 118 | 123 |

From the foregoing discussion and examples it will be apparent that the fatty acid radicals of crystallized triglycerides in the fat do not enter into the molecular rearrangement reaction. Therefore maximum change in the molecular structure of the fat is obtained when the catalyst is added to the completely molten fat and the mixture thereafter cooled to the desired temperature. However, the invention can also be practiced with some solid triglyceride present when the catalyst is added, and, in fact, the presence of a small amount of such solid material may be advantageous since it may exert a seeding effect and facilitate precipitation from the liquid phase of solid triglycerides formed in the rearrangement. This feature is shown in some of the examples.

Since the temperatures at which most fats can begin to form solid crystals are below 160° F., the temperature at which the rearrangement is conducted in accordance with this invention is, for most practical applications, below 160° F., sufficiently high that a substantial proportion of the fat is liquid and sufficiently low to permit the crystallization from the liquid fat of solid triglyceride fats of low solubility formed in the rearrangement. The process has been successfully operated at final temperatures as low as 32 to 40°

F., but even lower temperatures may be employed if desired.

It is to be noted that in the operation of the present invention the differences in solubility of various triglycerides that can be formed from the various combined fatty acids present in the fat are made to serve a useful purpose—that of directing the course of a molecular rearrangement reaction. Although the invention has been illustrated mainly in terms of the rearrangement of mixed saturated-unsaturated triglyceride fats with simultaneous precipitation of substantially completely saturated triglycerides having much lower solubility than other triglycerides in the liquid fat phase present, it is possible to apply the invention whether the difference in solubility of the various triglycerides is due to difference in degree of unsaturation or to difference in molecular weight of the fatty acids constituting these various triglycerides.

When such difference in solubility of the triglycerides is small, as may be the case when the fat being processed contains only saturated combined fatty acids differing only slightly in molecular weight, then it is more difficult to direct the rearrangement effectively. In such a situation the use of an inert fat solvent, such as pentane, hexane, etc., ethyl ether, benzene, Skellysolve, carbon tetrachloride, pyridine, which will show little or no activity toward either the fat or the catalyst, is valuable as a reaction medium in which the rearrangement may be conducted. The use of such solvents permits the use of lower temperatures of rearrangement than otherwise could be used and magnifies differences on which efficient operation of the present process depends. In special cases, the use of solvent has other advantages such as of facilitating the separation of solid and liquid fractions at the end of rearrangement when such separation is desired.

The time required for reaching equilibrium in the low temperature molecular rearrangement process herein described will vary according to the quantity of catalyst employed and other conditions of processing. In general, however, I have found that with normal catalyst usage as described below the greater proportion of the reaction takes place within 24 hours when temperatures from about 80° F. to about 100° F. are employed. At lower temperatures, such as 30° F. for example, a longer time, such as 72 to 96 hours, may be necessary to obtain the desired completeness of reaction. If a maximum change in molecular structure of the triglyceride fat is desired, then it may be necessary to permit the rearrangement with simultaneous crystallization of the solid triglyceride fat to take place for even a longer period of time, and such may be done without harmful effect.

The temperature schedule employed in conducting the molecular rearrangement reaction in accordance with the present process is not a limitation of the invention in its broadest aspects. Although any given temperature at which simultaneously rearrangement and crystallization will take place may be used at the start of the process and maintained substantially stationary until desired rearrangement is obtained, it is also possible to conduct the process so that a gradual reduction in temperature occurs as the reaction proceeds. The temperature schedule can also be controlled so that the precipitation of the solid triglycerides approaches or reaches a state of equilibrium at a series of successively lower temperatures.

Effective practice of the invention does not depend upon the use of any particular catalyst. Any molecular rearrangement catalyst which will promote the interchange of fatty acid radicals at the low temperatures required for crystallization is suitable for use.

It is not unlikely that the true catalyst for the rearrangement reaction is not the alkoxide or other compound added to the triglyceride, but rather a compound resulting from the reaction of such added compound with the triglyceride fat. For example, I have observed that almost immediately after the introduction of sodium methoxide into a fat there is formed substantially an equivalent amount of fatty acid methyl ester. It is the logical assumption, therefore, that the sodium has combined with the triglyceride fat in some form, and according to my theory this sodium-fat compound constitutes the active catalyst constituent in this particular instance.

My experience has led me to the conclusion that this formation of active catalyst in the glyceride mixture can take place either by direct reaction of alkali metal with triglyceride fat with displacement of hydrogen, or by the reaction of one or more of a great number of compounds which are capable of forming alkoxides by reaction with alcoholic substances. Such compounds will form alkoxides and, which is more to the point, will react with fats to form active catalyst when the material with which the metal or other cation is combined is not so acidic as to hold the cation in combination and prevent reaction with fat. Thus, for example, potassium or sodium in combination with practically any material less acidic than phenol can form the catalyst when added to the fat. Sodium phenoxide appears to be on the borderline between what may be referred to in the present sense as active and inactive materials because only slight activity of this material in low temperature molecular rearrangement is noted when liberal quantities are added to the fat. Compounds of sodium with materials more acidic than phenol (with fatty acid, for example, in the form of soap) will not react with the fat to form an active catalyst at the temperatures required in the practice of this invention.

In the above examples I have chosen to illustrate my process principally with the use of an alkoxide compound such as sodium methoxide. This specific compound is a practical material for use in promoting the rearrangement in accordance with my invention because of the ready occurrence of the raw materials and its ease of preparation, and therefore the major portion of my work on rearrangement processes involving application of the principles set forth herein has included the use of sodium methoxide. The methoxides of other alkali metals such as lithium, and especially potassium, are also active in forming catalytic materials with the fat. The methoxides of alkaline earth metals such as calcium also have been found to possess some activity in the range of temperatures required for the reaction. My work has also indicated that methoxides, in which the cation is the tetrasubstituted ammonium radical, such as tetramethyl ammonium methoxide and lauryl benzyl dimethyl ammonium methoxide also show activity in the reaction of the present invention.

In addition to the methoxides, the corresponding ethoxides, propoxides, butoxides, and alkoxides made from alcoholic compounds in general, such as lauryl alcohol, ethylene glycol, oleic acid monoglyceride, and others may be employed. Moreover I have discovered that the addition of alkali-metal-organic compounds containing the alkali metal atom directly bound to a carbon atom as in triphenylmethyl sodium will result in the promotion of the rearrangement as conducted by the present process. The addition of a suspension of metallic potassium in xylene or of an anhydrous suspension of potassium hydroxide in a hydrocarbon solvent consisting essentially of undecane has also resulted in the promotion of molecular rearrangement at low temperature.

Because of the great variety of materials that may be used to form the active catalyst and because the actual structure of the catalytic materials formed is as yet not accurately known, the catalytic materials are generically referred to in the claims as "low temperature molecular rearrangement catalysts."

Amounts of catalytic material equivalent to 0.5 per cent by weight sodium methoxide based on the weight of the fat may be employed, but there is no particular advantage in employing quantities much in excess of 0.2 per cent. Even small quantities, such as 0.03 per cent, are effective in promoting the rearrangement at low temperature but I have found that the reaction proceeds at a rather low rate unless at least 0.05 per cent is employed. My preferred range of catalyst usage is the equivalent of from about 0.05 per cent to about 0.5 per cent sodium methoxide.

The addition of the catalytic material to the triglyceride fat is preferably conducted in such a way that uniform distribution throughout the fat in a finely dispersed phase results. The examples above show the use of a solution of sodium methoxide in anhydrous methanol, and a fine dispersion of sodium methoxide in xylene. If alcoholic solutions are to be used, avoidance of the use of too much alcohol is to be observed since the use of large proportions results in the conversion of more fat into the methyl ester and a resulting decrease in the yield of glyceride product. The smallest amount of alcohol which can be employed to obtain good dispersion is the preferred amount, and accordingly I prefer to employ from about 0.1 per cent to about 3 per cent based on the weight of the fat undergoing treatment. Larger amounts, for example 6 to 8 per cent, may be employed and rearrangement in accordance with the invention will be observed, but the proportion of the by-product, methyl ester, will be greater for any given reaction period.

It is especially convenient to obtain the desired dispersion of the catalytic material in the oil with the use of an inert solvent such as xylene, toluene, petroleum naphtha, etc. Such dispersions may be prepared by the reaction of powdered sodium and alcohol in stoichiometric amounts in the solvent itself prior to addition thereof to the fat. In the case of catalytic materials that can be prepared in powdered form, such as powdered sodium methoxide, the powdered material may be mixed with the fat without the use of a carrier.

When the highly reactive catalytic materials referred to herein are employed to promote rearrangement in the practice of the process, it is desirable that the fat or fat mixture be essentially free from moisture and acids such as free fatty acids, carbon dioxide, etc., so as to avoid decomposition of catalytic material such as would reduce the content of same to an ineffective amount.

Because of the high degree of activity of catalytic materials employed in my process it is preferable to render the same inactive after the desired rearrangement has taken place and before the temperature of the fat is allowed to rise appreciably so that substantially no modification of the molecular rearrangement results during subsequent handling of the fat. I have noted, for example, that merely heating the rearranged fat in the presence of active catalyst to a temperature at which the crystallized portion becomes liquid, permits an undesirable reverse rearrangement in which the trisaturated glyceride content decreases as I have pointed out above in the description of Figure 2. Thus, in order to retain the desired degree and kind of rearrangement effected at low temperature it is preferable to treat the mixture containing the catalyst with an inactivating material, for example, an acid reacting compound such as hydrochloric acid, phosphoric acid, carbonic acid, glacial acetic acid, etc., or water, aqueous solutions, etc., and thereby inactivate the catalyst before any undesirable reverse molecular rearrangement takes place. If the rearranged fat is fairly fluid, as in the condition of a slurry, treatment with the acid material is a simple procedure. If, however, the fat is solid after rearrangement, or substantially so, it may be necessary to reduce it to granular form before treatment with the acid in order to inactivate the catalyst effectively.

While it may be desirable in some instances to employ the whole rearranged fat in the manufacture of desired products, in other instances it may be advantageous to effect separation of solid and liquid fractions of the fat. For example, if the fat, after rearrangement, is in the form of a solid-liquid, two-phase system in which substantial proportions of each phase are present, and separation into solid and liquid fractions is desired, the rearranged fat may be subjected to filter pressing or other means of separation without prior inactivation of the catalyst, provided the conditions of separation, such as temperature, etc., are such that no undesirable changes in molecular rearrangement take place. After separation of the fractions, the catalyst may be inactivated as suggested above.

Greater freedom in the separation of the rearranged fats into solid and liquid fractions is available if the catalyst in the rearranged product is first inactivated, thereby permitting subsequent remelting of the fat, fractional crystallization (with or without the aid of a solvent) and separation of liquid from solid to any desired extent.

The value of the instant process of rearrangement is very great. It makes possible the application of many specific fats to fields of uses which were not open to such fats heretofore. It permits the production of materials having little or no saturated fatty acids in the triglyceride molecules and the production of materials having little or no unsaturated fatty acids in the triglyceride molecules. By the present process, therefore, there may be produced by molecular rearrangement in contrast to direct synthesis, as above referred to, a combination of triglycerides having a relation of saturated to unsaturated molecules which will give plasticity over certain ranges of temperature where such plasticity is desirable as in the cooking fat industry.

Thus, for example, palm oil may be rearranged by this process and thereafter directly converted into a good plastic shortening, and as far as I am aware this has not been possible heretofore. In some cases where the application of my invention has been made to fats of high melting point for use in the plastic fat industry, it has been desirable to dilute the rearranged fat with liquid fats and thereafter convert into a shortening type product. I have also subjected palm oil rearranged by my process to fractional crystallization at relatively high temperature and have obtained a fraction in which has been purposely left enough of the fully saturated triglycerides to give it the characteristics required of ordinary shortening. Such a fraction can be used as such or in admixture with palm oil which has not been subjected to rearrangement to make a 100 per cent palm oil shortening of desired characteristics. Other applications of the instant process to shortening manufacture are more fully set forth in my copending application Serial No. 514,665, filed December 17, 1943, now abandoned.

The process has been employed in the rearrangement of coconut oil, palm kernel oil, and similar tropical nut oils, and from the rearranged product there has been obtained directly, or by hydrogenation, or, if desired, by fractional crystallization a solid fat which finds use as a confectioner's hard butter in the preparation of confections. Application of the instant process of rearrangement increases the proportion of high remelting triglycerides and therefore increases the yield of valuable product.

The process of this invention also finds use in the manufacture of improved drying oils from fish oil and soybean oil. For example, by suitable treatment of sardine oil or menhaden oil, a substantial proportion of the mixed saturated-unsaturated triglycerides is rearranged to completely saturated triglycerides and completely unsaturated triglyceride. From this mixture of triglycerides has been obtained by fractional crystallization a liquid fraction which contains a very substantial proportion of completely unsaturated fatty acid triglycerides and which is valuable as a drying oil for use in the drying oil industries.

The application of the present process to a number of fats has been disclosed in the examples, but it is to be understood that all natural triglyceride fats, including animal, vegetable, and marine triglycerides, will respond to the instant method of treatment and will undergo radical change in composition and properties.

Having thus described my invention, what I claim and desire to secure by Letters Patent is:

1. A process of rearranging the fatty acid radicals in a triglyceride fat constituted of combined fatty acids which in their free state differ in melting point, which comprises the step of intimately contacting said fat with a low temperature molecular rearrangement catalyst at a temperature, below 160° F., at which a substantial proportion of the fat is liquid, to cause rearrangement of the fatty acid radicals in the fat molecules, the temperature being sufficiently low to permit crystallization of solid triglycerides of low solubility as such triglycerides are formed.

2. A process of rearranging the fatty acid radicals in a triglyceride fat constituted of combined fatty acids which in their free state differ in melting point, which comprises the step of intimately contacting said fat in an inert fat solvent with a low temperature molecular rearrangement catalyst at a temperature, below 160° F., at which a substantial proportion of the fat is liquid, to cause rearrangement of the fatty acid radicals in the fat molecules, the temperature being sufficiently low to permit crystallization of solid triglycerides of low solubility as such triglycerides are formed.

3. A method of treating triglyceride fat to effect directed rearrangement of the fatty acid radicals in the fat molecules, which includes the steps of intimately contacting a fat, comprising mixed triglycerides constituted of combined fatty acids whose molecular structures differ in respects affecting solubility of glycerides thereof in the glyceride system, with a molecular rearrangement catalyst capable of promoting molecular rearrangement in fats at a temperature below 160° F. and within a range of which the lower limit is the lowest temperature at which a portion of the fat is liquid and the upper limit is the highest temperature at which higher melting triglyceride molecules can crystallize in the liquid fat as they are formed by rearrangement, and maintaining the fat temperature within the said range while progressive crystallization of higher melting triglyceride molecules formed in the rearrangement takes place.

4. A method of treating triglyceride fat to effect directed rearrangement of the fatty acid radicals in the fat molecules, which includes the steps of intimately contacting a fat, comprising mixed triglycerides constituted of combined fatty acids whose molecular structures differ in respects affecting solubility of glycerides thereof in the glyceride system, with a molecular rearrangement catalyst capable of promoting molecular rearrangement in fats at a temperature below 160° F. and within a range of which the lower limit is the lowest temperature at which a portion of the fat is liquid and the upper limit is the highest temperature at which higher melting triglyceride molecules can crystallize in the liquid fat as they are formed by rearrangement and thereby be precluded from further rearrangement, and maintaining the fat temperature within the said range while progressive crystallization of higher melting triglyceride molecules formed in the rearrangement takes place and until the proportion of high melting glycerides in the fat is substantially greater than the proportion which would result from rearrangement of the same fat in the absence of a solid fat phase.

5. A method of treating triglyceride fat to effect directed rearrangement of the fatty acid radicals in the fat molecules, which includes the steps of intimately contacting a fat, constituted of combined fatty acids whose molecular structures differ in respects affecting solubility of glycerides thereof in the glyceride system, with a low temperature molecular rearrangement catalyst, maintaining the temperature of the fat below 160° F., and at a temperature at which at least part of the fat is in liquid condition and at which the liquid fat becomes saturated with respect to higher melting component triglycerides thereof, whereby said component triglycerides crystallize, and progressively lowering the temperature of the fat to promote further crystallization of higher melting triglycerides as formed by rearrangement.

6. A method of treating triglyceride fat to alter the arrangement of fatty acid radicals in the molecule both with respect to the arrangement existing in the original fat and with respect to the arrangement achieved by high temperature catalytic rearrangement thereof, which comprises intimately contacting a fat, constituted of combined fatty acids whose molecular structures differ in respects affecting solubility of glycerides thereof in the glyceride system, at a temperature, less than 160° F., at which a substantial proportion of the fat is molten, and sufficiently low that trisaturated glyceride molecules will crystallize from solution in molten fat, with a catalyst capable of promoting rearrangement at such temperature, the said rearrangement being continued with crystallization of trisaturated glycerides formed in rearrangement and with corresponding increase in the proportion thereof in the whole fat mixture.

7. The process of claim 1 in which the catalytic material with which the fat is contacted is selected from the group consisting of alkali metal alkoxides, tetra ammonium substituted alkoxides and substances which form alkoxides by reaction with alcoholic compounds.

8. A process of effecting molecular rearrangement in mixed triglycerides constituted of combined fatty acids whose molecular structures differ in respects affecting solubility of glycerides thereof in the glyceride system, which comprises contacting said triglyceride, a substantial proportion of which is in molten condition, with a finely dispersed metal alkoxide catalyst at a series of successively lower temperatures below 160° F. and sufficiently low to permit crystallization of relatively insoluble solid triglycerides progressively during the rearrangement reaction.

9. The process of claim 8 in which the time permitted for reaction at each temperature is controlled so that the precipitation of solid triglycerides proceeds substantially to completion at each of the said successively lower temperatures.

10. The process of claim 1 in which the rearrangement is conducted under a blanket of inert gas.

11. A process of effecting molecular rearrangement in mixed triglycerides constituted of combined fatty acids whose molecular structures differ in respects affecting solubility of glycerides thereof in the glyceride system, which comprises dispersing an alkali metal methoxide throughout said triglyceride, a substantial proportion of which is in molten condition, and maintaining the temperature of the mixture thus formed below 160° F. and sufficiently low to permit crystallization of solid triglycerides of low solubility, the reaction being accompanied by progressive crystallization of said solid triglycerides as same are formed in the molecular rearrangement.

12. The process of claim 11 in which the alkali metal methoxide is sodium methoxide and the amount by weight dispersed is from about 0.05 per cent to about 0.5 per cent of the weight of the mixed triglycerides.

13. A process of effecting molecular rearrangement in mixed triglycerides constituted of combined fatty acids whose molecular structures differ in respects affecting solubility of glycerides thereof in the glyceride system, which comprises dispersing an alkali metal alkoxide throughout said triglycerides, a substantial proportion of which is in molten condition, maintaining the temperature of the mixture thus formed below 160° F. and sufficiently low to permit crystallization of solid triglycerides of low solubility formed during the rearrangement reaction, and, after the rearrangement has been permitted to take place with accompanying crystallization of solid triglycerides of low solubility, treating the rearranged product with an acid reacting compound, thereby inactivating the catalyst.

14. A process of converting a mixed triglyceride fat constituted of combined saturated and unsaturated fatty acids into a liquid fraction consisting predominantly of completely unsaturated triglycerides and a solid fraction consisting predominantly of completely saturated triglycerides, which comprises intimately contacting said fat with a low temperature molecular rearrangement catalyst for several hours at a temperature below 160° F. and within a range of which the lower limit is the lowest temperature at which a substantial portion of the fat is liquid and the upper limit is the highest temperature at which saturated triglycerides can crystallize in the liquid fat as a solid phase, maintaining the fat temperature within said range while crystallization of saturated triglycerides formed in the rearrangement takes place, inactivating the catalyst, heating the reacted mixture to render same wholly liquid, cooling the mixture and crystallizing the higher melting triglycerides to form the desired solid and liquid fractions, and separating the said solid and liquid fractions.

15. A process of converting a mixed triglyceride fat constituted of combined saturated and unsaturated fatty acids into a liquid fraction consisting predominantly of completely unsaturated triglycerides and a solid fraction consisting predominantly of completely saturated triglycerides, which comprises intimately contacting said fat with a low temperature molecular rearrangement catalyst for several hours at a temperature below 160° F. and within a range of which the lower limit is the lowest temperature at which a substantial portion of the fat is liquid and the upper limit is the highest temperature at which saturated triglycerides can crystallize in the liquid fat as a solid phase, maintaining the fat temperature within said range while crystallization of saturated triglycerides formed in the rearrangement takes place, separating the solid and liquid phases, and thereafter inactivating the catalyst.

16. A process of modifying the molecular structure of triglycerides comprising intimately contacting triglycerides constituted of combined fatty acids whose molecular structures differ in respects affecting solubility of glycerides thereof in the glyceride system with a low temperature molecular rearrangement catalyst at a temperature below 160° F. and within a range of which the lower limit is the lowest temperature at which a portion of the glyceride is liquid, and the upper limit is the highest temperature at which higher melting glyceride molecules can crystallize from the liquid glycerides as they are formed by rearrangement, maintaining the temperature within said range while progressive crystallization of higher melting glyceride molecules formed in the rearrangement takes place, and inactivating the catalyst.

17. The process of claim 16 in which the catalyst is inactivated prior to any complete melting of the reaction mix.

18. In the process of contacting triglycerides constituted of combined fatty acids whose molecular structures differ in respects affecting solubility of glycerides thereof in the glyceride system with a low temperature molecular rearrangement catalyst to cause molecular rearrangement at a temperature below 160° F., and within a range of which the lower limit is the lowest temperature at which a portion of the triglycerides is liquid and the upper limit is the highest temperature at which higher melting triglyceride molecules can crystallize from the liquid triglycerides as they are formed by rearrangement, the step which comprises adding the catalyst to the triglycerides in the presence of crystalline triglyceride.

19. In the process of contacting triglycerides constituted of combined fatty acids whose molecular structures differ in respects affecting solubility of glycerides thereof in the glyceride system with a low temperature molecular rearrangement catalyst to cause molecular rearrangement at a temperature below 160° F., and within a range of which the lower limit is the lowest temperature at which a portion of the triglyceride is liquid and the upper limit is the highest temperature at which higher melting triglyceride molecules can crystallize from the liquid triglycerides as they are formed by rearrangement, the steps of cooling the triglycerides to effect crystallization of a portion thereof, and thereafter mixing in the catalyst and permitting the rearrangement to take place.

20. In the process of contacting triglycerides constituted of combined fatty acids whose molecular structures differ in respects affecting solubility of glycerides thereof in the glyceride system with a low temperature molecular rearrangement catalyst to cause molecular rearrangement at a temperature below 160° F., and within a range of which the lower limit is the lowest temperature at which a portion of the triglyceride is liquid and the upper limit is the highest temperature at which higher melting triglyceride molecules can crystallize from the liquid triglycerides as they are formed by rearrangement, the steps of cooling the triglycerides to effect crystallization of a triglyceride portion comprising essentially triglycerides of low solubility in the triglyceride mixture, warming the mixture of liquid and solid triglycerides to effect solution of a substantial portion of the crystallized triglycerides without dissolving all of the least soluble triglycerides, adding the catalyst to the resulting triglyceride mixture and permitting the rearrangement to take place.

21. A preferentially arranged triglyceride fatty product formed by molecular rearrangement wholly from an original fatty triglyceride material constituted of combined saturated fatty acids of more than one kind and unsaturated fatty acids, in which product combined fatty acids are preferentially disposed to form substantially completely saturated triglycerides by the process of claim 16, the said substantially completely saturated triglycerides being primarily in a solid phase at the end of said rearrangement, and the mixture of triglycerides of said product existing in the liquid phase at the end of said rearrangement having combined fatty acids thereof in substantially random arrangement characteristic of rearrangement wholly in the liquid phase, the said product containing a substantially greater quantity of said substantially completely saturated triglycerides than the said original triglyceride material and than could exist under conditions of molecular rearrangement wholly in the liquid phase of the whole original material.

EDDY W. ECKEY.

REFERENCES CITED

The following references are of record in the file of this patent:

UNITED STATES PATENTS

| Number | Name | Date |
| --- | --- | --- |
| 1,873,513 | Van Loon | Aug. 23, 1932 |
| 2,154,452 | Jenness | Apr. 18, 1939 |
| 2,200,391 | Freeman | May 14, 1940 |
| 2,205,381 | Eckey | June 25, 1940 |
| 2,238,441 | Drew | Apr. 15, 1941 |
| 2,290,609 | Goss | July 21, 1942 |
| 2,309,949 | Gooding | Feb. 2, 1943 |
| 2,340,104 | Brown | Jan. 25, 1944 |